Figure 4:
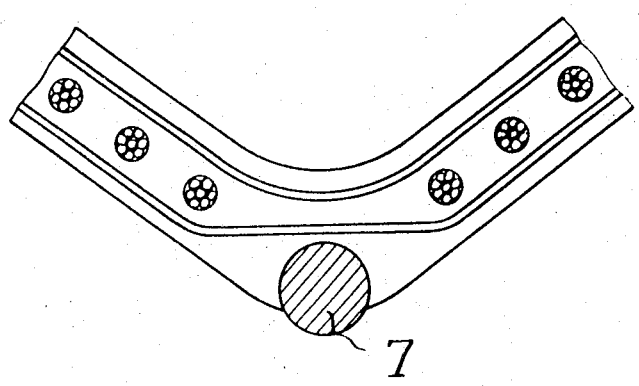

United States Patent [11] 3,630,340

[72] Inventors Henri Jacques Bouzat
Ferrand;
Roland Joug, Nohanet; Bernard Ragout,
Clermont-Ferrand, all of France
[21] Appl. No. 839,505
[22] Filed July 7, 1969
[45] Patented Dec. 28, 1971
[73] Assignee Pneumatiques Caoutchouc Manufacture et Plastiques Kleber-Colomber
Colombes, France
[32] Priority July 8, 1968
[33] France
[31] 158388

[54] REINFORCED CONVEYOR BELTS
4 Claims, 5 Drawing Figs.
[52] U.S. Cl. ........................................... 198/201
[51] Int. Cl. ......................................... B65g 15/40, B65g 15/34
[50] Field of Search ............................... 198/184, 193, 201

[56] References Cited
UNITED STATES PATENTS
| | | | |
|---|---|---|---|
| 439,282 | 10/1890 | Page ........................... | 198/193 X |
| 2,199,935 | 5/1940 | Johns .......................... | 198/201 X |
| 2,264,332 | 12/1941 | Peterson ...................... | 198/201 X |
| 3,144,930 | 8/1964 | Michels ........................ | 198/193 |
| 3,464,538 | 9/1969 | Hartmann ..................... | 198/201 |

FOREIGN PATENTS
| | | | |
|---|---|---|---|
| 1,110,561 | 2/1956 | France ......................... | 198/201 |
| 767,345 | 3/1952 | Germany ...................... | 198/201 |

*Primary Examiner*—Evon C. Blunk
*Assistant Examiner*—W. Scott Carson
*Attorney*—Holcombe, Wetherill & Brisebois ABSTRACT: This invention relates to reinforced conveyor belts, of the kind which are to assume a V-shape in use. According to the invention, a belt is provided with a reinforcement comprising a layer of parallel longitudinal elements interrupted in the central zone of flexure and also of two layers of parallel elements perpendicular to the axis of the belt, said latter layers being located on either side of the first-mentioned layer and closely adjacent one another in the central zone of flexure that is not provided with longitudinal elements.

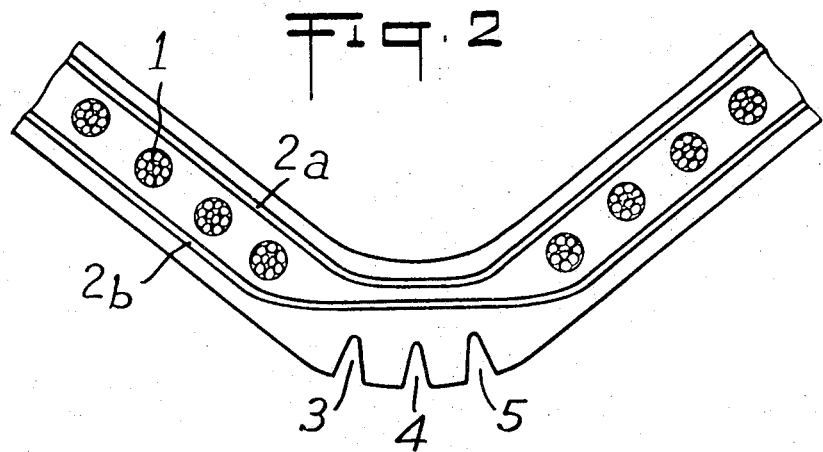
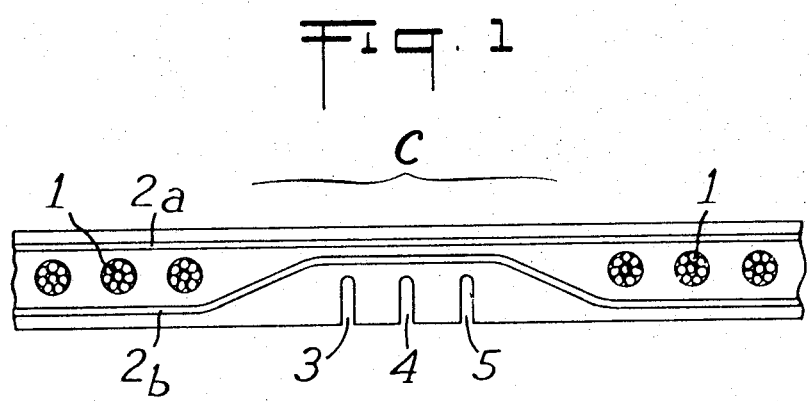
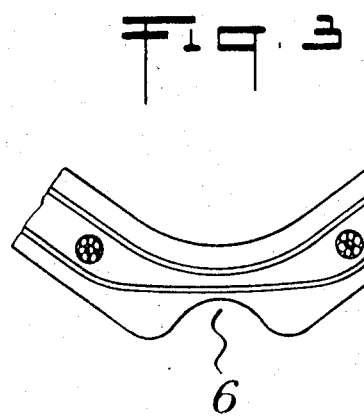

REINFORCED CONVEYOR BELTS

The present invention relates to reinforced conveyor belts and applies particularly to conveyor belts which are narrow and are subjected to considerable tensile stress during use.

Due to the size of their longitudinal reinforcement, which is generally in the form of one or two layers of longitudinal cables, belts of the kind referred to have a very high transverse rigidity which makes it very difficult, if not impossible, to shape them into a trough or channel. In addition, they are highly unstable on the sets of rollers which support them.

It has already been suggested that conveyor belts, instead of being shaped into a trough or channel, be made in a V-shape by deforming their flat surface into a dihedral. In certain belts of this type, the central portion which forms the point of the V has no reinforcement, a fact which facilitates flexure of the belt at this point.

However, all such V-shaped belts are provided with a reinforcement constituted by superimposed layers of a fabric laid crosswise, which does not allow them to be subjected to high tensile stresses during use.

Moreover, the rigidity of the sides of the dihedral forming the V is not sufficient for these belts, which circulate between rollers inclined in a V-formation, to be perfectly stable.

Finally, the complete absence of any reinforcement at this point of the V causes the belt to wear at this location.

Generally speaking, it may be said that prior to the invention no means had been found which made possible V-shaped conveyor belts which were suitable for transporting large quantities of heavy materials over long distances.

It is an object of the invention to provide a belt which is able to be made V-shaped but does not have the disadvantages of the V-shaped belts known hitherto. It is a further object that such a belt be particularly characterized by a greater rigidity in the sides, which ensures perfect stability on the sets of the rollers but which does not deleteriously affect the manner in which the belt rolls over the end drums; another object is that such a belt may withstand in service very high tensile stresses per unit of width while retaining the qualities above mentioned.

A reinforced conveyor belt according to the invention comprises a reinforcement which is formed of at least one layer of parallel, longitudinal elements which are arranged in two half-layers on either side of the central flexure zone and of two layers located on either side of the preceding layer and formed of elements which are parallel to one another and perpendicular to the axis of the belts, the latter two layers being located close to one another in the central flexure zone which is not provided with longitudinal reinforcing elements.

A belt according to the invention may, moreover, be provided, on its lower surface and in the central zone of flexure, with one or more longitudinal grooves. It may also be provided with an elastic element which is located in the central zone of flexure and is compressed or tensioned when the belt is flat so as to facilitate the V-shaping of the belt.

The longitudinal and transverse reinforcement elements are generally cables, which includes wires and stands of a material such as metal, glass, synthetic or artificial fabric or the like and possess considerable mechanical strength.

Figure 5:
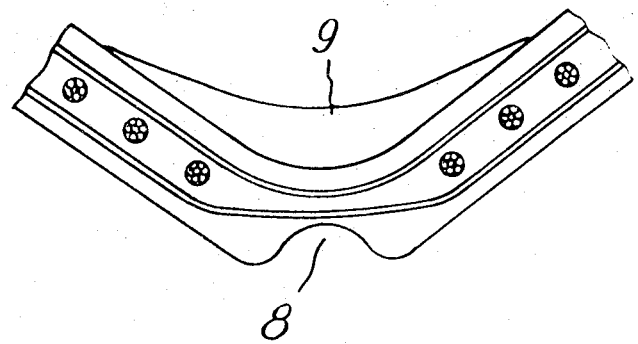

The invention will now be described in detail by means of the following embodiments given by way of nonlimiting example and diagrammatically shown in the accompanying drawings, in which:

FIG. 1 shows a cross section through the center portion of a belt according to the invention, when the belt is flat, FIG. 2 shows a cross section through the center portion of such a belt when it is V-shaped FIG. 3 shows a cross section through the center portion of another embodiment of belt according to the invention, when the belt is V-shaped FIG. 4 shows a cross section through the center portion of another embodiment of belt according to the invention when it is V-shaped and FIG. 5 shows a cross section through the center portion of a further embodiment of belt according to the invention, when it is V-shaped.

Referring now to the drawings, the reinforcement of the belt shown in FIG. 1 takes the form of a longitudinal layer of longitudinal metal cables 1 which are parallel to one another, and two transverse layers 2a and 2b formed of metal cables which are arranged transversely and parallel to one another. The cables 2a and 2b are of smaller diameter than cables 1. The cables 1 and 2a and 2b are of metal. The cables 2a of the upper transverse layer and cables 2b of the lower transverse layer are identical but they may alternatively be different, particularly as regards the material of which they are made, so as to possess different mechanical properties. For example, in order to adjust the rigidity of the sides to a desired value, one of the transverse layers may be constituted of cables having a particular resistance to compression while the other transverse layer may be formed of cables having a particular resistance to elongation.

The cables 1, which are in the same plane when the belt is flat, are arranged on either side of the center zone C in which flexure occurs when the belt is V-shaped so that this zone C is not provided with cables 1 and has thus a greater flexibility than do the other zones of the belt. In fact, because the conveyor belt has to be subjected in service to considerable tensile stresses per unit of width, the cables 1 are therefore made of large diameter and arranged close together; the transverse rigidity of the zone of the belt provided with cables 1 is too great to allow it to form a V.

However, although the transverse rigidity of the longitudinal layer formed by the cables 1 is too great to permit satisfactory flexure of this belt, it is insufficient to assure satisfactory transporting of materials and adequate stability of the belt on the rollers.

The two transverse layers formed by the cables 2a and 2b which are located on either side of the longitudinal layer, form a kind of upright support which considerably increases transverse rigidity. This transverse rigidity may be adjusted to a desired value by adjusting the distance between these two layers and by selecting the cables 2a and 2b with appropriate characteristics.

As is shown in the various Figures, the transverse layers are located close together in the central zone C so as to reduce transverse rigidity in this flexural zone and improve its flexibility. It will be seen that the flexural zone comprises reinforcing elements which impart to it the same transverse strength as the rest of the belt. This prevents the belt from wearing in the zone of flexure as has been the case in V-shaped belts hitherto.

Thus the belts of the invention are constituted by two side zones which form the sides of the V-shaped belt, have a substantial transverse rigidity and are separated by a central zone of reduced transverse rigidity which is the zone of flexure when the belt is shaped into a V.

In the embodiments shown in FIGS. 1 and 2, the flexibility of the center zone C has been improved by means of longitudinal grooves 3, 4, and 5, which together have the median plane of the belt as the plane of symmetry.

The flexibility of zone C may be further improved by other means such as by making this zone of a rubber of a degree of hardness less than that used for the rest of the belt.

In the embodiment shown in FIG. 3, the conveyor belt has the same reinforcement as in the case of FIGS. 1 and 2. Its lower surface is provided with a single longitudinal groove 6.

The belt shown in FIG. 4 has the same reinforcement as in the case of FIGS. 1 and 2. Its lower surface has a longitudinal groove in which is located an element 7 of an elastic material such as a solid or cellular rubber which is compressed when the belt is flat. The position of the element 7 facilitates the shaping into a V of the belt while reducing the effort required to bend it. The belt shown in FIG. 5 also has the same reinforcement as the belt shown in FIGS. 1 and 2 and its lower surface has a longitudinal groove 8 similar to that shown in FIG. 3. Its upper surface has, in the central zone, an elastic profiled portion 9 which extends over the full length of the belt and is tensioned when the belt is flat. Like the element 7 of the belt shown in FIG. 4, this profiled portion 9 facilitates the shaping of the belt into a V.

We claim:

1. A reinforced conveyor belt adapted to be formed into a V-shape in cross section and having a central zone of flexure about the length of its longitudinal axis and two side zones, one on each side of the central zone in plan view, said belt being provided with a reinforcement comprising a layer of parallel longitudinal cable elements providing tensile strength in each of the side zones, there being no longitudinal cable elements in the central zone of flexure, and two layers of parallel cable elements perpendicular to the longitudinal axis of said belt and extending at equal intervals throughout the length of the belt, said two layers being located, one on each side of said first-mentioned layers in cross section and being more closely adjacent one another in said central zone of flexure that is not provided with longitudinal elements than in the two side zones.

2. A conveyor belt as claimed in claim 1, wherein the lower surface of said belt is provided with at least one longitudinal groove arranged about the median plane of the belt as the plane of symmetry thereof.

3. A conveyor belt as claimed in claim 2, having one said longitudinal groove and wherein an element of elastic material is inserted into said groove which elastic material becomes compressed when said belt is flat.

4. A conveyor belt as claimed in claim 1, wherein the upper surface of said belt is provided with a longitudinal element which is arranged about the median plane of the belt as the plane of symmetry and is tensioned when the belt is flat.

* * * * *